United States Patent [19]

Osaka et al.

[11] Patent Number: 5,787,261

[45] Date of Patent: Jul. 28, 1998

[54] DATA TRANSFER SYSTEM, COMPUTER SYSTEM AND ACTIVE-LINE INSERTED/ WITHDRAWN FUNCTIONAL CIRCUIT BOARD

[75] Inventors: Hideki Osaka, Hiratsuka; Akira Yamagiwa, Naka-gun; Ryoichi Kurihara, Hadano; Masao Inoue, Sagamihara, all of Japan

[73] Assignee: Hitachi, Ltd, Tokyo, Japan

[21] Appl. No.: 563,106

[22] Filed: Nov. 27, 1995

[30] Foreign Application Priority Data

Nov. 28, 1994 [JP] Japan ................. 6-292993

[51] Int. Cl.$^6$ .................................... G06F 13/00
[52] U.S. Cl. ................ 395/283; 395/280; 395/282
[58] Field of Search .......................... 395/282, 283, 395/280, 309; 326/26, 21, 30

[56] References Cited

U.S. PATENT DOCUMENTS 5,530,302 6/1996 Hamre et al. .
5,604,873 2/1997 Fite et al. .

*Primary Examiner*—Jack B. Harvey
*Assistant Examiner*—Rupal D. Dharia
*Attorney, Agent, or Firm*—Fay Sharpe Beall Fagan Minnich & McKee

[57] ABSTRACT

It is an object of the present invention to provide an active-line inserted/withdrawn functional circuit board, a data transfer system and a computer system which systems allow the functional circuit board to be inserted and withdrawn with signal lines remaining in an active state while achieving a high speed data-transfer of a bus, and the reliability to be enhanced by eliminating malfunctions which occur particularly during the insertion of a functional circuit board.

The data transfer system or the computer system comprising: a functional circuit board having a functional circuit, a pre-charge resistor and a switching element connected in parallel to an input/output signal path of the functional circuit and a switching control means for controlling the conduction of the switching element through synchronization with a delayed clock signal resulting from delaying a bus clock signal for use in data transfers through the bus by a time shorter than a bus-clock cycle time of the bus clock signal; and a connector provided on an input/output end of the parallel connection of the pre-charge resistor and the switching element, whereby the functional circuit board can be inserted and withdrawn to and from the bus.

15 Claims, 8 Drawing Sheets

DATA TRANSFER SYSTEM, COMPUTER SYSTEM AND ACTIVE-LINE INSERTED/WITHDRAWN FUNCTIONAL CIRCUIT BOARD

BACKGROUND OF THE INVENTION

1. Field of the Invention

The present invention relates to a data transfer system and a computer system that allow new functions to be added by inserting and removing functional circuit boards in an electronic information processing apparatus or maintenance work such as replacement of a failing circuit or an unstably functioning circuit to be carried out with signal lines remaining in an active state, and a functional circuit board that can be inserted and withdrawn with signal lines remaining in an active state.

2. Description of the Related Art

There is a demand for an increased processing performance and an enhanced reliability of the electronic information processing apparatus such as mainly computers. In particular, an active-line insertion/removal technology for maintenance purposes is required. The active-line insertion/removal (live insertion/withdrawal) technology is to be applied particularly to a bus connecting a number of functional circuits in an electronic information processing apparatus. With the active-line insertion/removal technology, a functional circuit connected to a bus can be withdrawn and a new functional circuit can be connected to a bus without aborting operations of the bus, that is, without suspending data transfers taking place through the bus.

Conventional technologies for such insertion and removal of a functional circuit with the bus lines remaining in an active state is disclosed in Japanese Patent Laid-open No. Sho 2-125314 and Japanese Patent Laid-open No. Hei 4-88409.

In the case of the former conventional technology, a bus interface circuit is provided between each bus line and each functional circuit. By applying on/off control to the operation of the bus interface circuit, a functional circuit can be connected or disconnected to or from the bus without aborting the operation of the bus.

In the case of the latter conventional technology, on the other hand, a switching element such as a MOS field-effect transistor is provided between each bus line and each functional circuit. By turning the switching element on and off, the insertion and removal of a functional circuit with the bus lines remaining in an active state can be implemented.

In the case of the former conventional technology, however, since a bus interface circuit is newly added, an additional signal delay time is required due to the presence of this bus interface circuit. To be more specific, the additional delay time is in the range 2 to 10 ns in the case of a bus interface circuit composed of bipolar or MOS transistors. As a result, migration to a higher bus operation frequency is inevitably limited, giving rise to a problem that it is difficult to make an attempt to increase the data-transfer speed of the bus. In the case of the former conventional technology, a countermeasure that can keep up with a higher bus speed is not taken into consideration.

In the case of the latter conventional technology, on the other hand, the propagation delay along the switching element is small, making the technology appropriate for the enhancement of the bus speed. However, the electrostatic capacitances of the functional circuit and lines connecting the functional circuit to the switching element generate glitch noise on bus signals at switching times, giving rise to a problem that other functional circuits connected to the bus generate malfunctions because of the glitch noise. The glitch noise is generated on the bus as described above because there is a difference in potential between the bus and the lines of the inserted functional circuit which potential difference causes electric charge to be discharged or precharged at the time the switching element is put in a conductive state.

SUMMARY OF THE INVENTION

In order to solve the problems encountered in the conventional technologies as described above, it is an object of the present invention to provide a data transfer system and a computer system that allow functional circuit boards to be connected and disconnected to and from a bus thereof with signal lines remaining in an active state without aborting operations of an operational electronic information processing apparatus or bus transfers therein and to provide a functional board that can be inserted and withdrawn to and from the bus with signal lines remaining in an active state.

It is another object of the present invention to provide a data transfer system and a computer system that allow a functional circuit board to be connected and disconnected to and from a bus thereof without causing a malfunction to occur in other functional boards connected to the bus and can keep up with increased bus speeds and to provide a functional board that can be inserted and withdrawn to and from the bus with signal lines remaining in an active state.

In order to achieve the objects described above, according to one aspect of the present invention, there is provided a data transfer system having a bus for transferring data wherein a functional circuit board equipped with a functional circuit as well as a resistor and a switching element connected in parallel to an input/output signal path of the functional circuit can be connected and disconnected to and from the bus by means of a connector provided on the input/output end of the parallel connection of the resistor and the switching element.

In addition, according to another aspect of the present invention, there is provided a data transfer system having bus lines for transferring data wherein a functional circuit board equipped with a functional circuit as well as a pre-charge resistor and a switching element connected in parallel to a connector at a location on the input/output signal path of the functional circuit in close proximity to the connector can be connected and disconnected to and from the bus lines by means of the connector.

In addition, according to still another aspect of the present invention, there is provided a data transfer system having a bus for transferring data wherein a functional circuit board equipped with a functional circuit, a pre-charge resistor and a switching element connected in parallel to an input/output signal path of the functional circuit as well as a switching control means for controlling the conduction of the switching element by synchronization using a delayed clock signal obtained by delaying a bus clock signal for use in data transfers through the bus by a time shorter than a bus-clock cycle time can be connected and disconnected to and from the bus by means of a connector provided on the input/output end of the parallel connection of the pre-charge resistor and the switching element.

In addition, according to a still further aspect of the present invention, there is provided a data transfer system having bus lines for transferring data wherein a functional circuit board equipped with a functional circuit, a pre-charge resistor and a switching element connected in parallel to a connector at a location on the input/output signal path of the functional circuit in close proximity to the connector as well as a switching control means for controlling the conduction of the switching element by synchronization using a delayed clock signal obtained by delaying a bus clock signal for use in data transfers through the bus by a time shorter than a bus-clock cycle time can be connected and disconnected to and from the bus lines by means of the connector.

In addition, according to still another aspect of the present invention, there is provided a data transfer system having a bus for transferring data wherein a functional circuit board equipped with a functional circuit, a pre-charge resistor and a switching element connected in parallel to an input/output signal path of the functional circuit as well as a switching control means for controlling the conduction of the switching element in accordance with a board insertion completion signal can be connected and disconnected to and from the bus by means of a connector provided on the input/output end of the parallel connection of the pre-charge resistor and the switching element.

In addition, according to a still further aspect of the present invention, there is provided a data transfer system having bus lines for transferring data wherein a functional circuit board equipped with a functional circuit, a pre-charge resistor and a switching element connected in parallel to a connector at a location on the input/output signal path of the functional circuit in close proximity to the connector as well as a switching control means for controlling the conduction of the switching element in accordance with a board insertion completion signal can be connected and disconnected to and from the bus lines by means of the connector.

In addition, according to a still further aspect of the present invention, there is provided a data transfer system having bus lines for transferring data wherein a functional circuit board equipped with a functional circuit, a pre-charge resistor and a switching element connected in parallel to a connector at a location on the input/output signal path of the functional circuit in close proximity to the connector as well as a switching control means for controlling the conduction of the switching element by synchronization using a delayed clock signal obtained by delaying a bus clock signal for use in data transfers through the bus by a time shorter than a busclock cycle time in accordance with a board insertion completion signal can be connected and disconnected to and from the bus lines by means of the connector.

In addition, according to a still further aspect of the present invention, there is provided a computer system having a computer connected to a bus for transferring data wherein a functional circuit board equipped with a functional circuit as well as a pre-charge resistor and a switching element connected in parallel to an input/output signal path of the functional circuit can be connected and disconnected to and from the bus by means of a connector provided on the input/output end of the parallel connection of the pre-charge resistor and the switching element.

In addition, according to a still further aspect of the present invention, there is provided a computer system having a computer connected to a bus for transferring data wherein a functional circuit board equipped with a functional circuit, a pre-charge resistor and a switching element connected in parallel to an input/output signal path of the functional circuit as well as a switching control means for controlling the conduction of the switching element by synchronization using a delayed clock signal obtained by delaying a bus clock signal for use in data transfers through the bus by a time shorter than a bus-clock cycle time can be connected and disconnected to and from the bus by means of a connector provided on the input/output end of the parallel connection of the pre-charge resistor and the switching element.

In addition, according to a still further aspect of the present invention, there is provided an active-line inserted/withdrawn functional board equipped with a functional circuit as well as a pre-charge resistor and a switching element connected in parallel to a connector at a location on the input/output signal path of the functional circuit in close proximity to the connector.

In addition, according to a still further aspect of the present invention, there is provided an active-line inserted/withdrawn functional board equipped with a functional circuit, a pre-charge resistor and a switching element connected in parallel to a connector at a location on the input/output signal path of the functional circuit in close proximity to the connector, an input means for inputting a bus clock signal for use in data transfers through a bus as well as a switching control means for executing a control function by synchronization using a delayed clock signal obtained by delaying the bus clock signal input by the input means by a time shorter than a bus-clock cycle time.

In addition, according to a still further aspect of the present invention, there is provided an active-line inserted/withdrawn functional board equipped with a functional circuit, a pre-charge resistor and a switching element connected in parallel to a connector at a location on the input/output signal path of the functional circuit in close proximity to the connector, an input means for inputting a bus clock signal for use in data transfers through a bus as well as a switching control means for executing a control function by synchronization using a delayed clock signal obtained by delaying the bus clock signal input by the input means by a time shorter than a bus-clock cycle time in accordance with a board insertion completion signal also input by the input means.

In addition, according to a still further aspect of the present invention, there are provided a data transfer system, a computer system and an active-line inserted/withdrawn functional board wherein a MOS field-effect transistor is employed as a switching element in each functional board and a resistor having a resistance value greater than 200 ohms but smaller than 1,100 ohms is created on each functional board.

That is to say, according to a still further aspect of the present invention, a resistor and a switching element are provided in parallel on an input/output signal path of the on a functional circuit board connected to a bus and the resistor and the switching element are implemented at a location in close proximity to a connector of the functional circuit board. In addition, when the functional circuit board is inserted, the conduction of the switching element is controlled after the supply of power to the functional circuit board has been stabilized upon the completion of the insertion of the functional circuit board. On the top of that, the functional circuit board including a functional circuit can be inserted or withdrawn while the data transfer system or the computer system is operating without aborting or suspending the operation of the bus in the data transfer system or the computer system.

In addition, according to a still further aspect of the present invention, by controlling the switching element through synchronization with a delayed bus clock signal particularly when the functional circuit board is inserted, effects of glitch noise generated by switching can be eliminated.

According to the configuration described above, in an electronic information processing apparatus such as mainly a computer, a functional circuit board can be inserted without aborting or suspending the operation of the apparatus or the bus in the apparatus.

In addition, according to the configuration described above, by connecting a switching element and a pre-charge resistor in parallel, inserting a functional circuit board with the switching element put in a turned-off state will not generate glitch noise on the bus. On the top of that, even if the switching element is put in a conductive state after the functional circuit board has been inserted, the difference in potential between the bus and functional-circuit lines is reduced due to the operation of the pre-charge resistor, allowing the amount of glitch noise generated on the bus to be minimized.

In addition, the use of a switching element allows the propagation delay time along the switching element to be reduced substantially, giving rise to no restriction on the attempt to increase the data-transfer speed of the bus.

According to the configuration, it is possible both to increase the data-transfer speed of the bus and to insert as well as withdraw the functional circuit board with signal lines remaining in an active state as described above.

According to the present invention, the generation of glitch noise due to contact with the bus and the conduction of the switching element can be suppressed, making it possible to insert a functional circuit board to the bus without aborting or suspending the operation of the bus in the electronic information apparatus such as mainly a computer or the operation of the apparatus itself.

Since the switching element is conducting electricity when the functional circuit is in an operative state, the present invention has an effect that no restriction on the attempt to increase the data-transfer speed of the bus is seen due to a time delay caused by the pre-charge resistor connected in parallel to the switching element. That is to say, the present invention also exhibits an effect that it is possible both to increase the data-transfer speed of the bus and to insert as well as withdraw the functional circuit board with signal lines remaining in an active state.

In addition, according to a still further aspect of the present invention, by synchronizing the conduction timing of the switching element with a bus clock signal by means of a switching control means, a difference in potential between the bus on a back panel and stubs (tapped-offs) on the functional circuit board can be surely suppressed during the insertion of the functional circuit board, allowing a functional circuit to be inserted without aborting or suspending the operation of the bus in the electronic information apparatus or the operation of the apparatus itself. As a result, the reliability of the electronic information apparatus such as mainly a computer can be enhanced.

DESCRIPTION OF THE PREFERRED EMBODIMENTS

Figure 1:
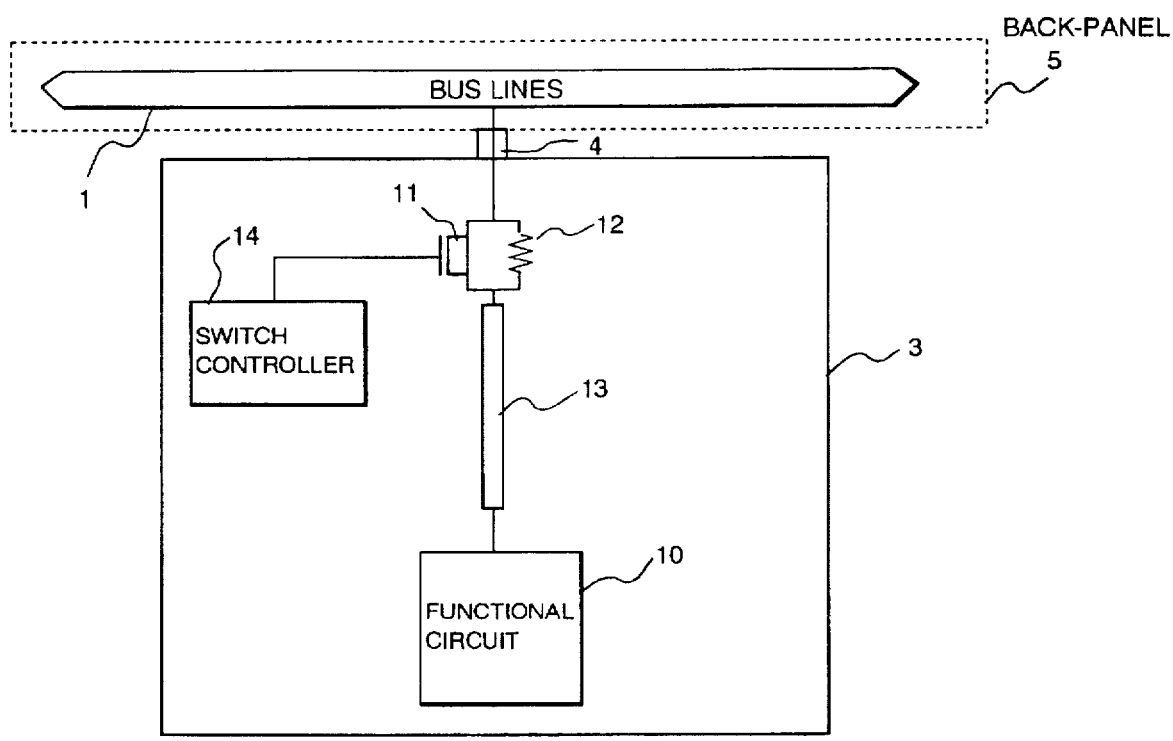
FIG. 1 is a diagram showing a rough configuration of a first embodiment implementing a data transfer system in accordance with the present invention which data transfer system allows a functional circuit board to be inserted and withdrawn with signal lines remaining in an active state.

A first embodiment provided by the present invention is explained in concrete terms by referring to FIG. 1. Reference numeral 1 shown in the figure denotes bus lines connected directly to a CPU in an electronic information apparatus such as mainly a computer or bus lines for transferring data in an electronic information apparatus such as mainly a computer. The bus lines 1 are implemented on a back panel 5. Reference numeral 3 is a functional circuit board that can be inserted and withdrawn. Even though not shown in the figure, a plurality of functional circuits are connected to the bus lines 1. The CPU may be connected to any of the functional circuits. Reference numeral 4 is a connector through which the functional circuit board 3 is connected to the back panel 5.

Reference numeral 10 is a functional circuit implemented on the functional circuit board 3. The functional circuit 10 is connected to the bus lines 1 through the connector 4, a switching element 11, a pre-charge resistor 12 and a stub (tapped-off) 13. In this case, a MOS field-effect transistor is employed as the switching element 11. It should be noted, however, that another device such as a relay or a bipolar transistor that can execute operations at a high speed can also serve as the switching element 11 as well. As shown in the figure, the switching element 11 is connected to the pre-charge resistor 12 in parallel. In addition, the functional circuit 10 has an electrostatic capacitance. In particular, a C-MOS LSI has a large capacitance. In the case of a C-MOS LSI, a capacitance in the range 10 to 15 pF is normal.

It should be noted that, as shown in FIG. 1, a set of components comprising the switching element 11 and the pre-charge resistor 12 is inserted between the connector 4 and the stub (tapped-off) 13. In actuality, however, such a set is inserted at least for each signal line output by the functional circuit board 3.

Reference numeral 14 is a switching control means for controlling the on/off operations of the switching element 11. Power can be supplied to the functional circuit board 3 through power-supply and ground pins which are assigned as other pins of the connector 4 during insertion. As an alternative, the power can also be supplied through a connection means such as a connector provided separately.

When the functional circuit board 3 is inserted with signal lines remaining in an active state, only after the connector 4 has been perfectly connected and after the supply of power to the functional circuit board 3 has been stabilized will a reset signal be transmitted to the functional circuit 10 by the system and will the switching control means 14 control the switching element 11 to switch from a non-conductive state to a conductive state.

The completion of the connection of the connector 4 can be detected by a separately provided switch's being turned on by the user. As an alternative, the completion of the connection of the connector 4 can also be detected automatically by detecting the contact of a pin shorter than other pins provided on the connector 4.

When the functional circuit board 3 is withdrawn with signal lines remaining in an active state, the functional circuit board 3 is notified by the system of the active-line removal as is disclosed in the IEEE 896.2 with the title "Futurebus+, Physical Layer Specifications & Profile". Receiving the notification from the system, the functional circuit board 3 takes the following steps:

(1) Complete all jobs currently being processed.

(2) Make an attempt not to participate in further bus transactions.

(3) Release all outputs to the bus. (Put them in a high-impedance state).

Here, according to the present invention, when the functional circuit board 3 is informed by the system of the active-line removal, the bus access by the functional circuit 10 and the operation to output control signals and the like are aborted as described above. Thereafter, receiving the notification of the active-line removal from the system, the switching control means 14 controls the switching element 11 to switch from a conductive state to a non-conductive state before the functional circuit board 3 is taken out.

Since the switching element 11 is put in a non-conductive state prior to the active-line removal as described above, even in the event of a serious failure such as a failure that occurs in the functional circuit 10, making it impossible to release bus signals, the functional circuit board 3 can be withdrawn without affecting the bus lines 1 and other functional circuit boards.

It should be noted that the switching element 11 is in a conductive state while the functional circuit 10 is operating during a period starting from a point of time a conduction signal from the switching control means 14 is received after the insertion of the functional circuit board 3 and ending at a point of time a non-conduction signal is received prior to the removal of the functional circuit board 3. In this state, the propagation delay through the switching element 11 is so small that it can be ignored. As a result, no restriction is encountered in efforts to enhance the data transfer speed of the bus.

Figure 2:
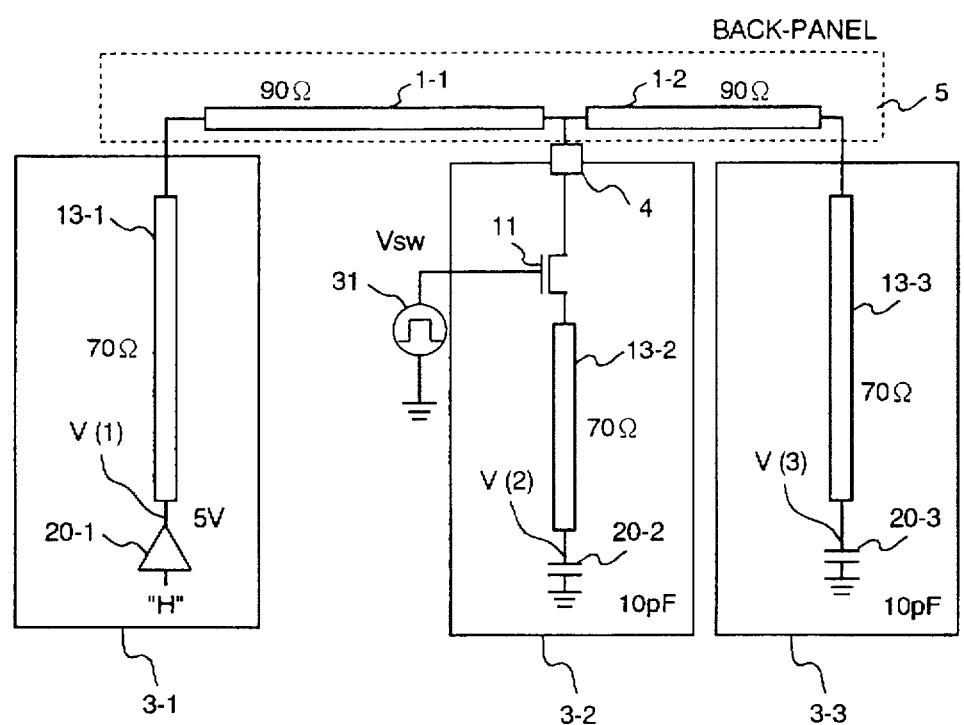
FIG. 2 is a diagram showing a circuit configuration used for explaining by comparison effects of the present invention.

Referring to FIGS. 4 to 7, the operation of the first embodiment provided by the present invention and a glitch-noise reduction effect observed during insertion of the functional circuit board 3 are explained by comparison with a configuration shown in FIG. 2.

FIG. 2 shows an equivalent circuit of an active-line inserted/withdrawn circuit employing a bus switch in a typical back-panel bus system. Reference numerals shown at a variety of portions in the figure denote simulation conditions to be described later.

Reference numerals 1-1 and 1-2 shown in the typical circuit configuration of FIG. 2 denote transmission lines serving as buses on the back panel 5. Reference numerals 3-1, 3-2 and 3-3 each denote a functional circuit board to be inserted or withdrawn to or from the back panel 5. In this example, the functional circuit boards 3-1 and 3-3 have already been mounted, transferring data through the buses 1-1 and 1-2. Let the connector 4 of the functional circuit board 3-2 be newly inserted. In this case, after the voltage applied to the functional circuit board 3-2 has been stabilized, the switching element 11 is put in a conductive state. Reference numerals 13-1, 13-2 and 13-3 are stubs (tapped-offs) originating from the buses 1-1 and 1-2. The stubs (tapped-offs) 13-1 to 13-3 are connected to input/output buffers 20-1 to 20-3 respectively of functional circuits 10-1 to 10-3 which are not shown in the figure.

Assume, here, that the functional circuit 10 of the functional circuit board 3-1 outputs "H" data (=5V) and that the other functional circuit boards 3-2 and 3-3 connected to the buses 1-1 and 1-2 are in a high-impedance state, outputting nothing. Furthermore, let the switching element 11 of the functional circuit board 3-2 be in a conductive state. That is to say, only electrostatic capacitances are connected to the buses in the equivalent circuit. For this reason, the input/output buffers 20-2 and 20-3 of the functional circuits 10-2 and 10-3 are expressed by the electrostatic capacitances of the input/output circuits.

In the case of the functional circuit board 3-2, the value of the electrostatic capacitance is in the range 10 to 20 pF provided the switching element 11 does not exist and the semiconductor is a C-MOS. In this embodiment, the value of the capacitance is 10 pF. The length of the stub (tapped-off) 13-2 depends on the size of the connected functional circuit 10. In the case of recent multi-pin LSI chips, there are some packages having a size in the range 40 to 50 mm. Accordingly, the length of the stub (tapped-off) 13-2 can be in the range 50 to 100 mm. The line capacitance is of the order of 1.0 pF per cm, or 5 to 10 pF per LSI chip. Adding the line capacitance to the capacitance of the functional circuit 10 results in a total capacity of 15 to 20 pF, a large value that can not be ignored in comparison with a bus capacitance of 150 to 200 pF. As a result, when there is a difference in potential between bus signals, glitch noise is generated.

On the other hand, the effect of glitch generated noise on bus signals seen when inserting a connector with the switching element put in a non-conductive state is small. This is because the capacitance of inserted signal lines is the sum of the capacitance of the lines from the connector 4 to the switching device 11 and the input capacitance of the switching element 11. Since the lines are implemented at a shortest length of about 5 to 10 mm, this total capacity has a small value of 5 to 6 pF. The amount of glitch noise generated by precharging and discharging phenomena to and from this total capacitance is small, being about 1/40 to 1/20 of the signal swing. Reference numeral 31 is a control power supply for controlling the switching element 11. When the control power supply 31 outputs a "H" signal, the switching element 11 is put in a conductive state. An N-channel MOS field-effect transistor is a typical optimum switching element. A P-channel MOS transistor enters a conductive state for an "L" output. Voltages appearing at the terminals of the output buffer 20-1, the capacitor (input/output buffer) 20-2 and the capacitor (input/output buffer) 20-3 are expressed by V(1), V(2) and V(3) respectively.

Figure 3:
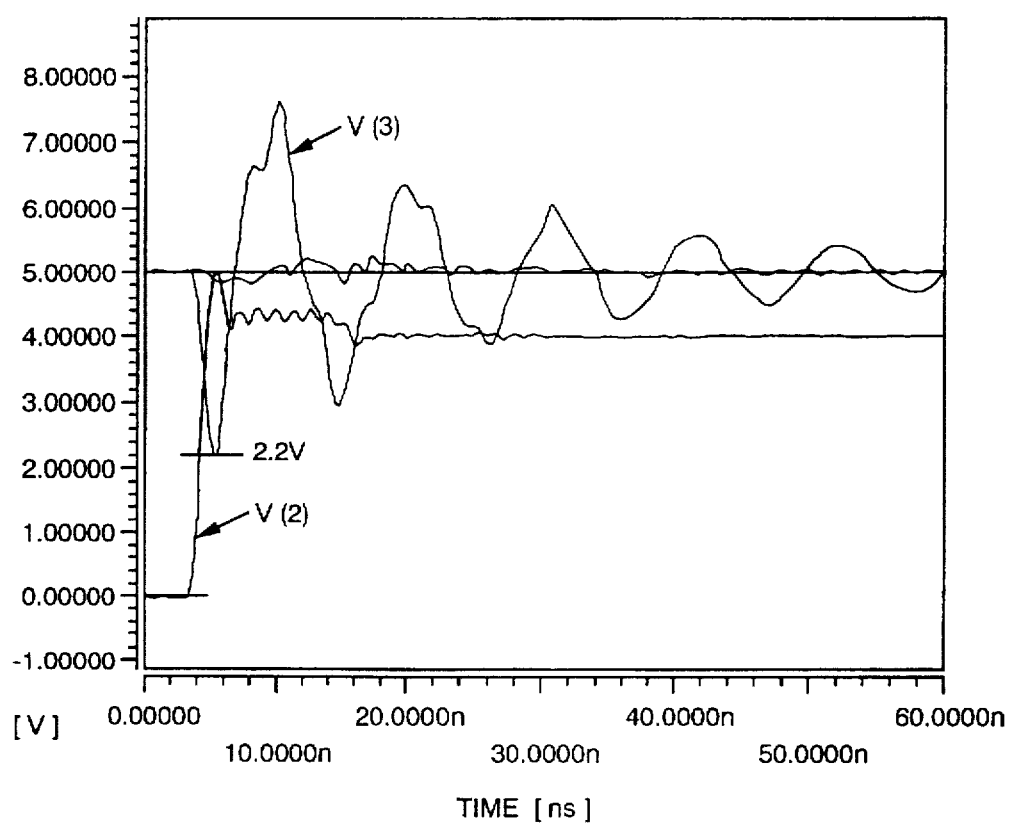
FIG. 3 is a diagram showing voltage waveforms appearing at various points in the configuration shown in FIG. 2.

FIG. 3 is a diagram showing waveforms obtained from simulation based on the above equivalent circuit with the functional circuit board 3-2 inserted to the bus with signal lines remaining in an active state. The figure shows voltage waveforms of V(2) and V(3) resulting from putting the switching element 11 in a conductive state 2 ns after the start of the simulation. It is obvious from the figure that V(3) drops from 5V to 2.2V. To be more specific, the results indicate that, when the switching element 11 is put in a conductive state after the functional circuit board 3-2 has been inserted, glitch noise having an amplitude of 2.8 V (=5V–2.2V) is generated in other functional circuit boards connected to the bus. This glitch noise level can result in a malfunction which in turn causes the apparatus to function incorrectly due to the glitch noise.

Next, the operation of the first embodiment provided by the present invention and a glitch-noise reducing effect observed during board insertion are explained by referring to FIGS. 4 to 7. Components identical with those shown in FIG. 2 are assigned the same reference numerals and their explanation is not repeated in the following description.

Figure 4:
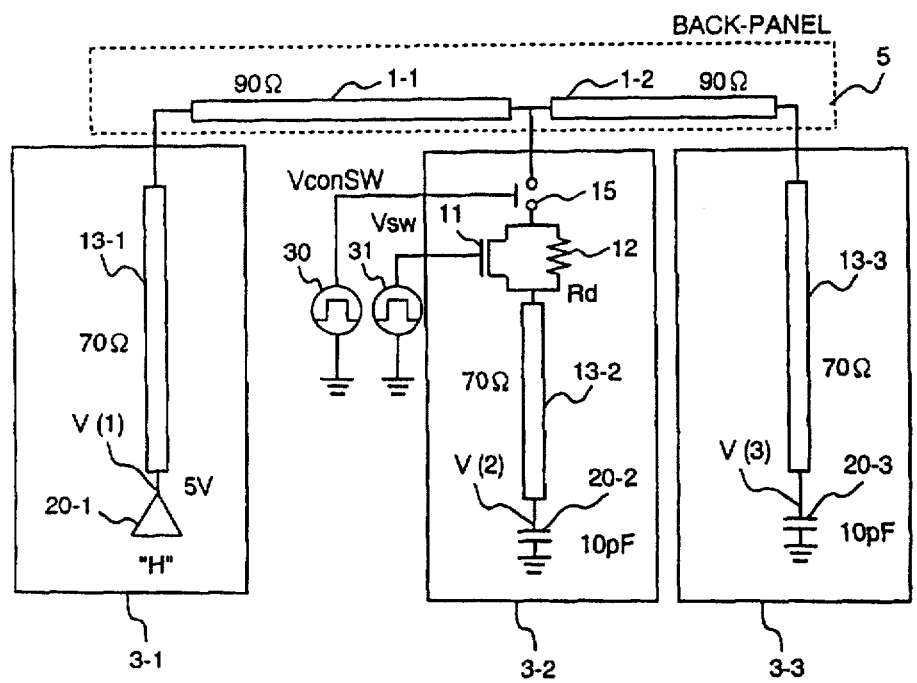
FIG. 4 is a diagram showing a circuit configuration of the first embodiment provided by the present invention.

Much like the embodiment shown in FIG. 2, in the case of the embodiment shown in FIG. 4, the functional circuit boards 3-1 and 3-3 have been mounted on the back panel 5 while the functional circuit board 3-2 is newly inserted. The present embodiment is a circuit model used for analyzing the effect of the parallel connection of the switching element 11 and the pre-charge resistor 12 employed in the first embodiment. In this case, a signal output by the switching control means 14 is replaced by an equivalent one output by the control power supply 31. In addition, the equivalent circuit of the connector 4 functioning during the insertion of the functional circuit board 3-2 is replaced by a switch 15. This is because, when the functional circuit board 3-2 is inserted, it takes only an instantaneous time for the pins of the interfacing connector 4 of the functional circuit board 3-2 to get electrically connected with the back panel 5 since their coming into contact with each other.

The state in which the connector 4 has been brought into contact with the back panel 5 is replaced with an equivalent conductive state of the switch 15 in order to do a circuit analysis. Reference numeral 30 is a control power supply of the switch 15.

Figure 5:
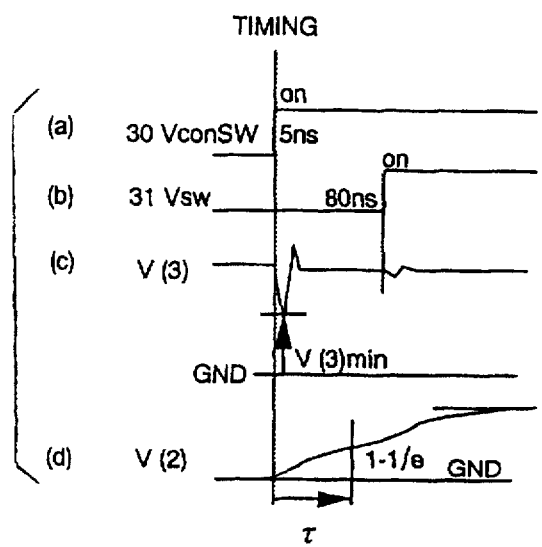
FIG. 5 is a diagram showing timing charts of the circuit configuration shown in FIG. 4.

FIG. 5 is a diagram showing waveforms at various points of the circuit configuration shown in FIG. 4 which waveforms are obtained from simulation.

FIG. 5(a) shows timing of a signal controlling the switch 15, that is, a signal output by the control power supply 30. The control power supply 30 controls the switch 15 in such a way that the switch 15 enters a conductive state 5 ns after the simulation is started as shown in the figure.

FIG. 5(b) shows timing of a signal controlling the switching element 11. The control power supply 31 controls the switching element 11 in such a way that the switching element 11 enters a conductive state 80 ns after the simulation is started as shown in the figure. The switching element 11 is deliberately controlled to enter a conductive state at a point of time behind a point of time at which the switch 15 conducts electricity. This is because, after the switch 15 has entered a conductive state, the bus waveforms will get stabilized before the switching element 11 is turned on so that interference between the switch 15 and the control power supply 31 is reduced.

FIG. 5(c) shows the voltage waveform V(3) of the capacitor (input/output buffer) 20-3 which serves as a model of the functional circuit 10-3 implemented on the functional circuit board 3-3. The figure also shows a lowest point of the waveform V(3) resulting from an effect of glitch noise generated by the conduction of the switch 15. The lowest point is denoted by the symbol V(3)min.

FIG. 5(d) shows the voltage waveform V(2) of the capacitor (input/output buffer) 20-2 which serves as a model of the functional circuit 10-2 implemented on the functional circuit board 3-2 being inserted. The figure also shows the definition of a time constant (delay time) τ. The time constant (delay time) τ is defined as a time lapsing since a point of time, at which the connector 4 came into contact with the back panel 5 or the switch 15 entered a conductive state, till the magnitude of the voltage V(2) drops to (1−1/e) or 63.2% of the signal swing, where e is the base of the natural logarithms.

Figure 6:
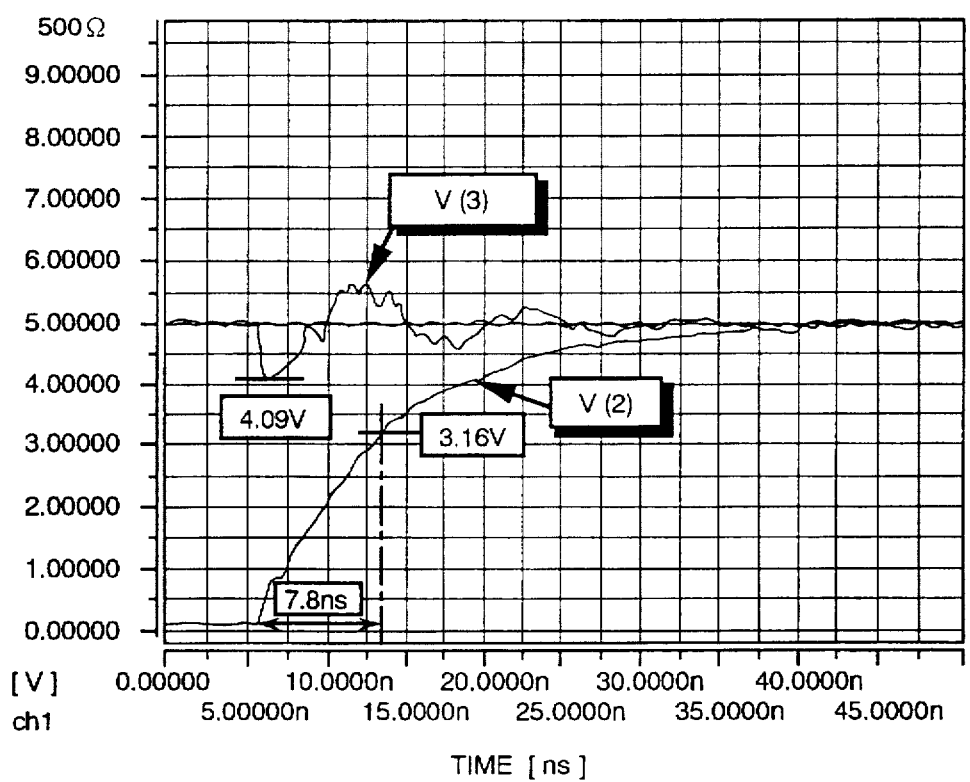
FIG. 6 is a diagram showing voltage waveforms appearing at various points in the circuit configuration of the first embodiment shown in FIG. 4.

FIG. 6 is a diagram showing voltage waveforms appearing at various points in the circuit configuration of the first embodiment shown in FIG. 4 which voltage waveforms are obtained from simulation with the resistance value of the pre-charge resistor 12 set at 500 ohms. It is seen from the figure that the lowest point V(3)min is 4.09 V and the time constant (delay time) τ is 7.8 ns.

Figure 7:
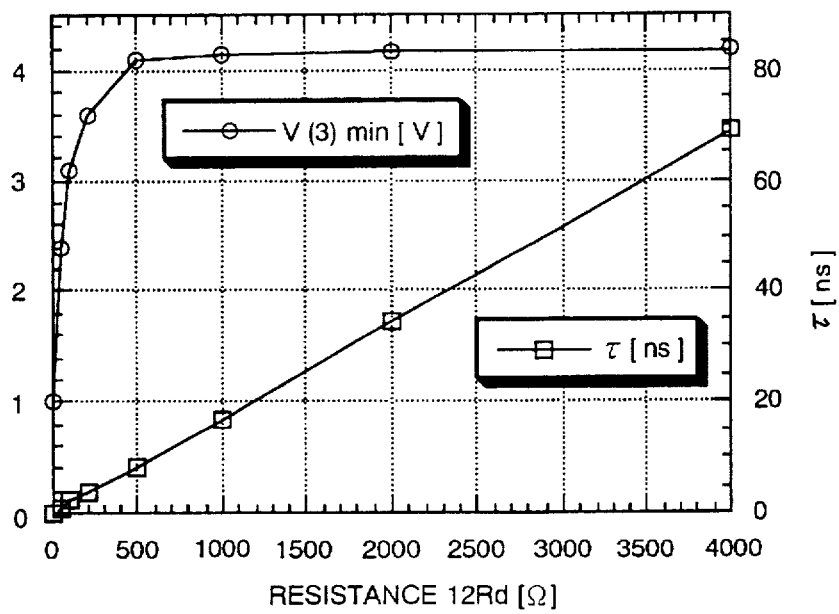
FIG. 7 is a diagram showing correlation between bus glitch noise and the delay time with a pre-charge resistor of the first embodiment of the present invention varied.

FIG. 7 shows how the lowest point V(3)min and the time constant (delay time) τ change when the resistance value of the pre-charge resistor 12 is varied from 50 ohms to 4 Kohms. As shown in the figure, as the resistance value of the pre-charge resistor 12 increases, the time constant (delay time) τ also increases all but linearly but the lowest point V(3)min gradually approaches about 4.2 V along an asymptote for resistance values greater than 500 ohms. That is to say, for resistance values smaller than 200 ohms, the time constant is small but the amount of generated glitch noise is big. It is also obvious from the figure that, with the pre-charge resistor 12 having a resistance value of 200 ohms, the voltage of the generated glitch noise is 1.42 V (=5–3.58) V, an amount smaller than an input margin, giving rise to no problem in the case of TTL and C-MOS semiconductors. It is thus desirable to employ a pre-charge resistor 12 having a resistance value of greater than 200 ohms.

It is also obvious from the figure that, with the pre-charge resistor 12 having a resistance value of greater than 500 ohms, the voltage of the generated glitch noise is 0.91 V (=5−4.09) V, a sufficiently allowable value even if glitch noise of the order of 0.5 V such as power-supply ripples is superimposed thereon. It is therefore desirable to employ a pre-charge resistor 12 having a resistance value of greater than 500 ohms in order to enhance reliability.

In order to keep up with a high-speed bus, on the other hand, it is necessary to suppress the time constant (delay time) τ at a value smaller than the bus-clock cycle time Tclk. This is because, as the resistance value of the pre-charge resistor 12 increases, the time constant (delay time) τ becomes longer, making it impossible for the stub voltage of the inserted functional circuit board to follow bus signals.

It is obvious from FIG. 7 that the resistance value Rd of the pre-charge resistor 12 is linearly proportional to the time constant (delay time) τ. The voltage V(2) is a function of time expressed by V2(t) which can be approximated by the following equation:

$$V2(t)=Eo(1-\text{Exp}(-t/\tau)) \quad (1)$$

where τ is the time constant of a circuit comprising the pre-charge resistor 12 with the resistance value Rd and an electrostatic capacitor C connected to each other in series. The value of the time constant τ is equal to Rd×C (τ=Rd×C). The symbol Eo is the output voltage of the input/output buffer 20-1 shown in FIG. 4. It is obvious from FIG. 7 that the value of the electrostatic capacitor C is about 17.2 pF.

Since the voltage appearing on the stub (tapped-off) 13-2 of the inserted functional circuit board 3-2 is delayed by the pre-charge resistor 12, a glitch may be generated on the bus if the mount of the delay is big. The cause of such a glitch is explained as follows. If the amount of the delay exceeds a bus-clock cycle time, the switching element 11 is turned on at a point of time after the transition from a bus cycle to the next one. If, at the transition from a bus cycle to the next one, the output of the driver (input/output buffer) 20-1 changes from "H" to "L" or vice versa, a difference in voltage between the bus 1 and the stub (tapped-off) 13-2 remains big, causing a glitch noise to be generated on the bus 1. In order to reduce the magnitude of the glitch noise, it is necessary for the voltage of the stub (tapped-off) 13-2 to follow the signal voltage of the bus. To be more specific, it is required that the potential V(2) of the stub (tapped-off) 13-2 follow the bus potential or a potential at about the same level as the output voltage Eo of the input output buffer 20-1 within the bus-clock cycle time Tclk. Let X denote a ratio of the voltage V2 (Tclk) observed during a bus-clock cycle time Tclk to the voltage Eo as follows:

$$V2(Tclk)=X*Eo \quad (2)$$

Substituting Eq. (2) to Eq. (1) and rearranging the result of the substitution yield Eq. (3):

$$Rd=Tclk/(C*Log(1/(1-X))) \quad (3)$$

Eq. (3) is a relation between the resistance value Rd of the pre-charge resistor 12 and the ratio X, a precharging rate representing the line voltage V(2) relative to the output voltage Eo of the input/output buffer during a bus-clock cycle time.

In the case of a 33 MHz high-speed bus with a bus-clock cycle time of 30 ns and an electrostatic capacitor of 17.2 pF, the same value as that shown in FIG. 4, for example:

in a design with a precharging rate of greater than 70%, the pre-charge resistor 12 must have a resistance value of smaller than 1.4 Kohms;

in a design with a precharging rate of greater than 80%, the pre-charge resistor 12 must have a resistance value of smaller than 1.1 Kohms;

in a design with a precharging rate of greater than 90%, the pre-charge resistor 12 must have a resistance value of smaller than 750 ohms; and in a design with a precharging rate of greater than 95%, the pre-charge resistor 12 must have a resistance value of smaller than 582 ohms.

Furthermore, in the case of a 60 MHz high-speed bus, on the other hand:

in a design with a precharging rate of greater than 70%, the pre-charge resistor 12 must have a resistance value of smaller than 724 ohms;

in a design with a precharging rate of greater than 80%, the pre-charge resistor 12 must have a resistance value of smaller than 540 ohms;

in a design with a precharging rate of greater than 90%, the pre-charge resistor 12 must have a resistance value of smaller than 378 ohms; and in a design with a precharging rate of greater than 95%, the pre-charge resistor 12 must have a resistance value of smaller than 291 ohms.

The E-series resistors actually available in the market have resistance values close to the ones calculated above.

As described above, it is necessary to employ a pre-charge resistor 12 having a resistance value of greater than 200 or, desirably, a resistance value of greater than 500 ohms. At the same time, an upper limit of the resistance value of the pre-charge resistor 12 can be found from Eq. (3) provided the bus operating frequency, the electrostatic capacitance C of the functional circuit board inserted with signal lines remaining in an active state and the precharging rate X are known. As a result, the amount of glitch noise generated during the active-line insertion and the time delay caused by the pre-charge resistor 12 can be determined optimally.

It should be noted that, since the length of the stub (tapped-off) 13-2 ending at the connection to the bus and the input capacitance of the functional circuit 10 are functions of LSI package and bus interface, their actual values may be greater or smaller than the numbers used here. Even in this case, an optimum resistance value Rd of the pre-charge resistor 12 can be found from Eq. (3).

After the insertion of the connector 4 has been completed and the difference in voltage between the bus 1 and the stub (tapped-off) 13-2 has become small, the change in V(3) is small as shown in FIG. 5(c), causing no malfunction to occur in other functional circuit boards even if the switching element 11 enters a conductive state as shown in FIG. 5(b). It should be noted that the number 80 ns shown in FIG. 5(b) is a time taken as a simulation condition. In actuality, however, this number can have any value provided the difference in voltage described above has been decreased to a small value.

Glitch noise generated as a result of the insertion of a functional circuit board has been described so far. When a functional circuit board is withdrawn, on the other hand, there is no difference in potential between the bus line and the withdrawn line. As a result, no glitch noise is generated on the bus signal, giving rise to no cause of the occurrence of a malfunction.

As described above, by virtue of the parallel connection of the switching element 11 and the pre-charge resistor 12, the contact of the inserted connector 4 and the conductive state of the switching element 11 do not generate glitch noise, that can cause a malfunction to occur in another functional circuit board, on the bus. As a result, a functional circuit board can be inserted without aborting or suspending the operation of the apparatus and/or the bus in the apparatus.

In addition, since the switching element 11 is conducting electricity when the functional circuit 10 is in an operative state, the present invention has an effect that no restriction on the attempt to increase the data-transfer speed of the bus is seen due to a time delay caused by the pre-charge resistor 12 connected in parallel to the switching element 11. That is to say, the present embodiment also exhibits an effect that it is possible both to increase the data-transfer speed of the bus and to insert as well as withdraw a functional circuit board with signal lines remaining in an active state.

Figure 8:
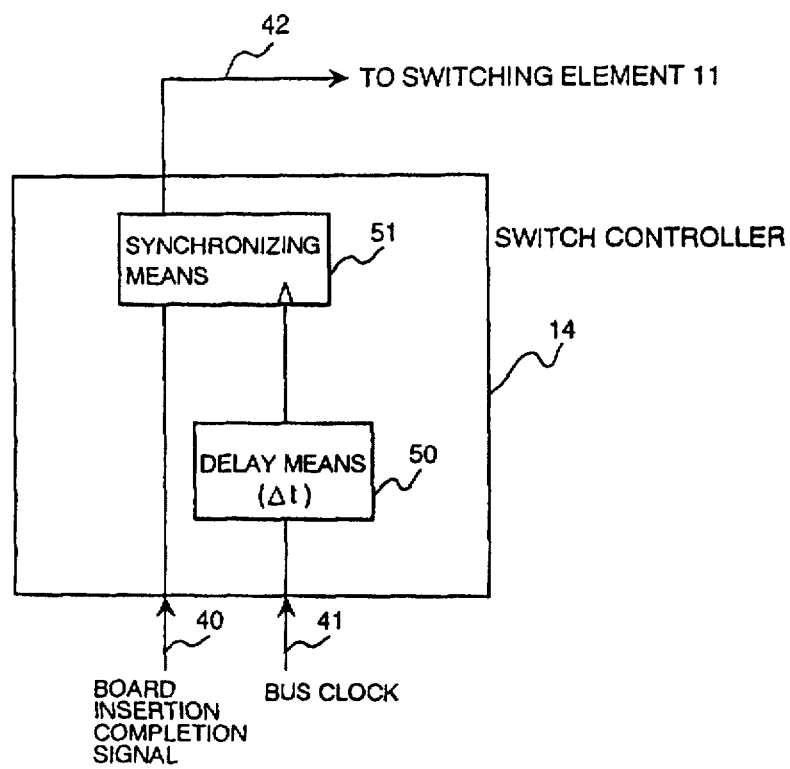
FIG. 8 is a diagram showing a rough configuration of a second embodiment implementing a switching control means in accordance with the present invention.

Next, a second embodiment provided by the present invention is explained by referring to FIG. 8.

FIG. 8 is a diagram showing a rough configuration of a second embodiment implementing a switching control means 14 in accordance with the present invention. Reference numeral 40 shown in the figure is a board insertion completion signal for indicating the completion of the insertion of the connector 4. Much like the first embodiment, the completion of the insertion of the connector 4 can be detected by a separately provided switch's being turned on by the user. As an alternative, the completion of the insertion of the connector 4 can also be detected automatically by detecting the contact of a pin shorter than other pins provided on the connector 4. In addition, the functional circuit board 3 is equipped with an input means (input terminal) for receiving the board insertion completion signal 40.

In general, a synchronous bus includes a clock line for transmitting a clock signal in addition to data lines, address lines and control lines. Data is transferred in accordance with the clock signal. To be more specific, data is transmitted and received with timing synchronized with the clock signal. For this reason, the system always has a mechanism for generating and distributing a clock signal. Reference numeral 41 shown in FIG. 8 is a bus clock signal coming from a clock distributor not shown in the figure. The clock distributor can be provided on the functional circuit board. As an alternative, a clock signal can be provided by the back panel 5 through the connector 4. In addition, the functional circuit board 3 is equipped with an input means (input terminal) for receiving the bus clock signal 41.

Reference numeral 50 is a signal delaying means for delaying the bus clock signal 41 by DELTAt seconds. Reference numeral 51 is a synchronizing means for synchronizing the board insertion completion signal 40 to the bus clock signal 41. Reference numeral 42 is a control signal for controlling the switching element 11. It is easy to design the synchronizing means 51 by using a D flip-flop.

Used for controlling a number of switching elements 11 provided on a plurality of signal lines, the switching-device control signal 42 can be output through a buffer provided after the synchronizing means 51 in order to beef up the power of the switching-device control signal 42.

Figure 9:
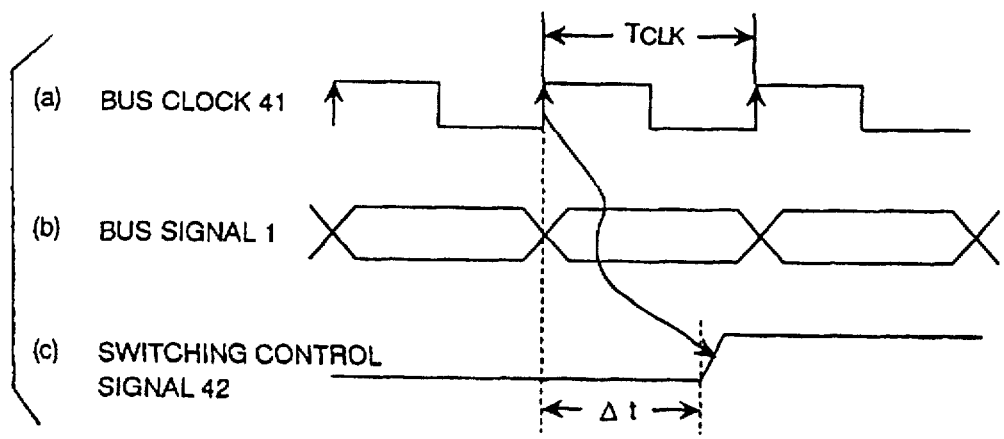
FIG. 9 is a diagram showing timing charts of the switching control means shown in FIG. 8.

FIG. 9 is a diagram showing timing charts prevailing at the time a functional circuit board is inserted. The bottom chart of this figure shows the timing of the switching-device control signal 42 for controlling the switching element 11 after the following events have been completed one after another:

(1) Insertion of the functional circuit board 3.

(2) Stabilization of the power-supply voltage applied to the functional circuit 10.

(3) The resetting of the functional circuit 10 by a reset signal generated in each functional circuit board.

FIGS. 9(a), (b) and (c) show the timing charts of the bus clock signal 41, a signal on the bus 1 provided on the back panel 5 and the switching-device control signal 42 for controlling the switching element 11 respectively. The operations of the synchronizing means 51 and the signal delaying means 50 cause the switching-device control signal 42 shown in FIG. 9(c) to be always generated with timing lagging behind the transition from a bus cycle to a next one of the signal on the bus 1 shown in FIG. 9(b) by DELTAt seconds.

The value of DELTAt is explained as follows. Since the switching-device control signal 42 is synchronized to a delayed clock signal, the voltage V2 of the stub (tapped-off) 13 always varies along a precharging or discharging curve expressed by Eq. (1) with the voltage of the bus 1 or the voltage Eo output by the input/output buffer of the functional circuit 10 taken as a reference at the time the switching element 11 is turned on. At the time the switching element 11 is turned on, the ratio of the voltage appearing on the stub (tapped-off) 13 to the voltage appearing on the bus 1 is expressed by the following equation:

$$X = V2 \text{ (DELTAt+Tpzh)}/Eo \quad (4)$$

where Tpzh is the switching time of the switching element 11, a time lapsing since the arrival of the switching-device control signal 42 at the switching element 11 till the stub (tapped-off) 13 is connected to the bus 1. In the case of the switching element 11 made of a C-MOS material, the switching time Tpzh has a typical value in the range 1.5 to 6.5 ns. With the switching element 11 entering a conductive state at a point of time right after a bus-cycle transition, the difference in voltage between the bus 1 and the stub (tapped-off) 13 or the voltage ratio becomes a maximum when data on the bus 1 changes from "L" to "H" or vice versa, inevitably giving rise to a big bus glitch. For this reason, it is necessary to adjust the value of DELTAt so that the switching element 11 enters a conductive state prior to a bus-cycle transition and to reduce the difference in voltage or the voltage ratio.

Here, the value of DELTAt is controlled in such a way that the sum of the value of DELTAt, the switching time Tpzh of the switching element 11 and a clock skew of the system become smaller than the bus-clock cycle time Tclk. Here, by the clock skew, a phase time difference among clock signals supplied to all functional circuits connected to the bus 1 is meant. In general, the clock skew has a value not exceeding about 10% of the bus-clock cycle time. Speaking in concrete terms, in the case of a 30-ns bus-clock cycle time, the value of DELTAt is computed by subtracting the switching time Tpzh having a value in the range 1.5 to 6.5 ns and the clock skew which is equal to 3 ns, 10% of the bus-clock cycle time, to produce a result in the range 20.5 to 25.5 ns. In the case of the switching control signal 42 traveling along a long line and the synchronizing means 51 having a long delay, the propagation delay time of the signal is further subtracted from the subtraction result described above. For the switching control signal 42 traveling along a line of about 12 cm, the propagation delay time caused by the line is about 1 ns.

In addition, in the case of a 15-ns bus-clock cycle time, the value of DELTAt is computed by subtracting the switching time Tpzh having a value in the range 1.5 to 6.5 ns and the clock skew which is equal to 1.5 ns, 10% of the bus-clock cycle time, to produce a result in the range 7 to 12 ns. Likewise, in the case of the switching control signal 42 traveling along a long line and the synchronizing means 51 having a long delay, it is necessary to further subtract the propagation delay time of the signal from the subtraction result described above. With such control, it is possible to put the switching element 11 in a conductive state in synchronization with the clock signal prior to the transition of the bus-clock cycle time Tclk after the stub (tapped-off) 13 has been precharged or discharged, giving rise to an effect that the amount of the bus glitch noise generated on the bus 1 can be reduced substantially.

Next, the pre-charge resistor 12 with a resistance value Rd is described. The ratio of the voltage of the stub (tapped-off) 13 to the voltage of the bus 1 prior to the conduction of the switching element 11 can be computed from Eq. (4) if an average value taking variations in clock skew into consideration is used. The ratio X represents a precharging rate at the point of time (DELTAt+Tpzh). Substituting Eq. (4) to Eq. (1) and rearranging the result of the substitution yield Eq. (5) as follows:

$$Rd = (\text{DELAT}t + \text{Tpzh})/(C * \text{Log}(1/(1-X))) \quad (5)$$

It is obvious from Eq. (5) that the resistance value Rd of the pre-charge resistor 11 is a function of the precharging rate X and the electrostatic capacitance C. That is to say, the relation expressed by Eq. (5) is a relation between the resistance value Rd of the pre-charge resistor 11 and the precharging rate X, a ratio of the line voltage to the input/output-buffer voltage, which relation holds true when the switching element 11 is to be synchronized with the clock signal.

It should be noted that, even if the switching element 11 enters a conductive state at (DELTAt+Tpzh), the difference in voltage between the bus 1 and the stub (tapped-off) 13 varies depending upon the precharging rate X, causing the magnitude of the bus glitch due to the conduction to also vary as well. This is because, when the switching element 11 is turned on at an insufficient pre-charge amount, waveforms shown in FIG. 3 result. A relation between the resistance value Rd of the pre-charge resistor 11 and the bus glitch noise is shown next.

A glitch noise margin Vnm of the input circuit of a functional circuit is defined as follows:

$$VnmH = Voh.min - Vih.min \quad (6)$$

$$VnmL = Vil.max - Vol.max \quad (7)$$

where Voh.min is a minimum output voltage of "H" data whereas Vol.max is a maximum output voltage of "L" data. Similarly, Vil.max is a maximum input voltage of "L" data whereas Vih.min is a minimum input voltage of "H" data. In the case of a representative TTL interface, VnmH=0.7 V (=2.7 V−2.0 V) and VnmL=0.3 V (=0.8 V−0.5 V). In the case of a representative 3.3 V C-MOS interface, on the other hand, VnmH=1.35 V (=3.0 V−1.65 V) and VnmL=0.67 V (=1.0 V−0.33 V).

The amount of bus glitch noise Vglitch generated when the switching element 11 is turned on is proportional to the difference in voltage between the bus 1 and the stub (tapped-off) 13. For Voh=5 V and the resistance value Rd=0 ohm, the generated glitch noise is found from FIG. 7 to be 4 V, leading to the following equation.

$$5:4 = Eo^*(1-X): Vglitch\ noise \quad (8)$$

where X is the precharging rate and Eo * (1−X) is the difference in voltage between the bus 1 and the stub (tapped-off) 13 at a precharging rate of X.

In the case of the TTL, Eo or the output voltage VoH of the bus interface circuit is 3.5 V. Accordingly, Vglitch noise can be suppressed to a value smaller than the glitch noise margin as indicated by the following:

$$Vglitch\ noise < VnmL = 0.3 \quad (9)$$

Substituting Ineq. (9) to Eq. (8) yields a value of X greater than 89.5%.

In the case of a 33 MHz high speed bus or a bus-clock cycle time of 30 ns and an electrostatic capacitance C of 17.2 pF which is equal to the value shown in FIG. 4, for example, the resistance value is smaller than 750 or 582 ohms for a design with a precharging rate of greater than 90% or 95% respectively.

In the case of a 60 MHz high speed bus, on the other hand, the resistance value is smaller than 378 or 291 ohms for a design with a precharging rate of greater than 90% or 95% respectively.

As described above, when a MOS transistor switching circuit is used, it is necessary to employ a pre-charge resistor 12 having an optimum resistance value of greater than 200 or, desirably, an optimum resistance value of greater than 500 ohms. At the same time, the optimum resistor value must be smaller than 750 ohms or, desirably, 582 ohms for a bus-clock cycle time of 30 ns, or the optimum resistor value must be greater than 200 ohms and smaller than 378 ohms or, desirably, 291 ohms for a busclock cycle time of 15 ns.

For a case in which the electrostatic capacitance C of the stub (tapped-off) 13 of the functional circuit board 3 to be inserted or withdrawn with signal lines remaining in an active state has a value different from 17.2 pF or a case with a bus operating frequency and/or an input glitch noise margin different from what has been described above, likewise, the upper limit of the resistance value of the pre-charge resistor 12 can also be found by using Eqs. (4) to (8), making it possible to optimally determine the amount of glitch noise generated during the active-line insertion and the delay time caused by the pre-charge resistor 12.

In addition, exactly the same effects can also be obtained as well even if the switching element 11, the precharging circuit 12 and the switching control means 14 shown in FIG. 1 are provided on the back panel 5. This means that, by merely adding an active-line insert/remove circuit comprising the switching element 11, the precharging circuit 12 and the switching control means 14 to the back panel 5 of a system having a back-panel bus but no active-line insert/remove function, a system allowing a functional circuit board to be inserted and withdrawn with signal lines remaining in an active state can be built with ease without modifying the functional circuit board.

By synchronizing the conduction timing of the switching element 11 to the bus clock signal 41 using the switching control means 14, a difference in potential developed during the active-line insertion between the bus 1 on the back panel 5 and the stub (tapped-off) 13 on the functional circuit board 3 being inserted can be surely reduced, making it possible to completely reduce the amount of glitch noise generated on the bus to a substantially small value. As a result, the reliability of an electronic information processing apparatus such as mainly a computer can be enhanced more and more. On the top of that, a functional circuit can be inserted without aborting or suspending the operation of the electronic information processing apparatus such as mainly a computer and/or the operation of the bus in the apparatus.

In addition, when the functional circuit 10 is in an operative state, the switching element 11 is conducting electricity. As a result, a delay generated by the switching element 11 and the pre-charge resistor 12 does not impose any restrictions on efforts to increase the data-transfer speed of the bus. That is to say, it is possible both to increase the data-transfer speed of the bus and to insert as well as withdraw the functional circuit board with signal lines remaining in an active state with a high degree of reliability.

Figure 10:
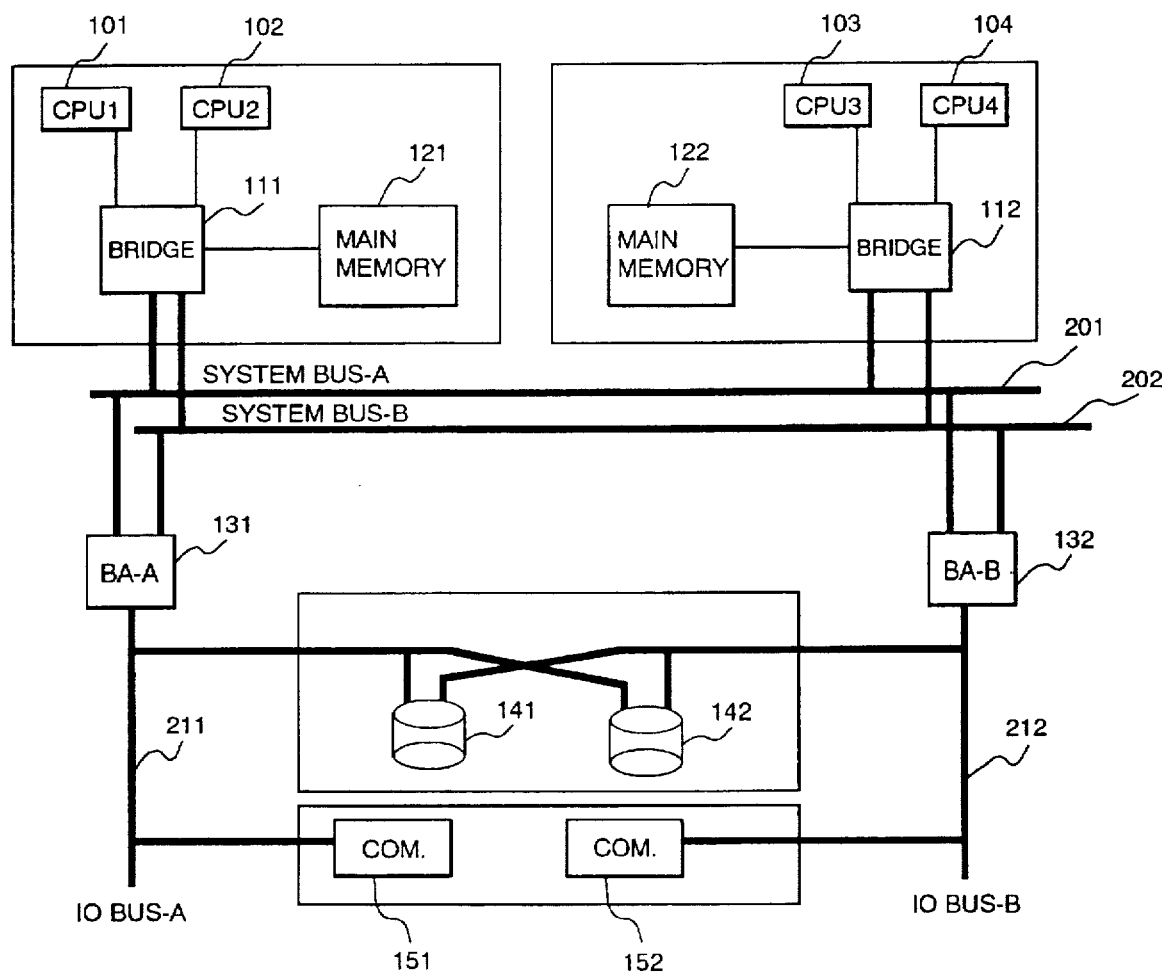
FIG. 10 is a diagram showing the configuration of an embodiment applying the present invention to a fault tolerant computer.

Next, an embodiment applying the present invention to a fault tolerant computer is explained by referring to FIG. 10. Reference numerals 101 to 104 shown in the figure each denote a CPU. Reference numerals 111 and 112 are bus bridges for connecting the CPUs 101 to 104, main memory units 121 and 122 and system buses 201 and 202 to each other. Reference numerals 141 and 142 are RAID disks cross-connected to I/O buses 211 and 212. Reference numerals 151 and 152 are communication function modules connected to the I/O buses 211 and 212 respectively. Reference numerals 131 and 132 each denote a bus bridge. The components shown on the left side of the figure are identical to those shown on the right side, composing two identical redundant systems. The redundancy of the two systems is, however, deliberately introduced to increase the fault tolerance. In the configuration of this dual system, the active-line insertion and removal can be implemented by adding the pre-charge resistor, the switching element and the control circuit provided by the present invention to functional modules connected to the buses 201, 202, 211 and 212. By so doing, a failing module can be withdrawn and a new function can be added from or to the system regardless of whether or not the system is in a conductive or operative state. This capability can also be applied to mission-critical systems which do not allow a system-down to occur. Examples of such mission-critical systems are computation systems, automatic note issuing systems, reservation systems and exchange systems.

The same function can also be provided to system configurations other than that shown in FIG. 10 wherein CPUs and main memory units are connected directly to system buses.

What is claimed is:

1. A data transfer/computer system comprising:
   a plurality of functional circuit boards, each equipped with a functional circuit wherein at least one of said functional circuit boards is equipped with a connector; and
   a data bus connected to said functional circuit on at least one of said functional circuit boards, the other end of said data bus being connected to a resistor and a switching element connected in parallel, and the other end of the parallel resistor and switching element being connected to a terminal of said connector, for transferring data among said plurality of functional circuit boards through said connector.

2. The data transfer system according to claim 1 wherein a MOS field-effect transistor is employed as said switching element of said functional circuit board.

3. The data transfer system according to claim 1 wherein said resistor of said functional circuit board has a resistance value of greater than 200 ohms.

4. The data transfer system according to claim 1 wherein said resistor of said functional circuit board has a resistance value of smaller than 1,100 ohms.

5. A data transfer/computer system comprising a bus for transferring data, said data transfer system comprising a connector and a functional circuit board having a functional circuit, wherein a pre-charge resistor and a switching element connected in parallel are interposed between said functional circuit and said connector at a location in close proximity to said connector on an input/output signal path of said functional circuit, wherein said connector allows said functional board to be inserted and withdrawn to and from said bus.

6. A data transfer/computer system comprising:
   a plurality of functional circuit boards, each equipped with a functional circuit, wherein at least one of said functional circuit boards is equipped with a connector;
   a data bus connected to said functional circuit on said at least one of said functional circuit boards, the other end of said data bus being connected to a resistor and a switching element connected in parallel, and the other end of the parallel resister and switching element being connected to a terminal of said connector, for transferring data among said plural functional circuit boards through said connector; and
   a switching element control means for controlling conduction of said switching element, for synchronizing said switching element with the bus clock of said data bus by use of a delay clock which is delayed by a time shorter than a period of said bus clock, after completion of insertion of said functional circuit board and after an energization to said functional circuit has become stationary.

7. A data transfer/computer system comprising a data bus, a connector and a functional circuit board having a functional circuit, wherein a pre-charge resistor and a switching element connected in parallel are interposed between said connector and said functional circuit at a location in close proximity to said connector on an input/output signal path of said functional circuit and a switching control means for controlling conduction of said switching element for synchronizing said switching element with a delayed clock signal resulting from delaying a bus clock signal for use in data transfers though said bus by a time shorter than a bus-clock cycle time of said bus clock signal, wherein said connector allows said functional board to be inserted and withdrawn to and from said bus.

8. A data transfer/computer system for transferring data, said data transfer system comprising:
   a functional circuit board adapted for connection to a data bus, said board having a functional circuit, a pre-charge resistor and a switching element connected in parallel with said pre-charge resistor, and disposed on an input/output signal path of said functional circuit, and a switching control means for controlling conduction of said switching element in accordance with a board insertion completion signal; and
   a connector provided on an input/output end of said pre-charge resistor and said switching element, whereby said functional circuit board can be inserted and withdrawn to and from said bus.

9. A data transfer/computer system comprising a bus for transferring data, a connector and a functional circuit board having a functional circuit, a pre-charge resistor and a switching element connected in parallel and interposed between said functional circuit and said connector at a location in close proximity to said connector on an input/output signal path of said functional circuit and a switching control means for controlling conduction of said switching element in accordance with a board insertion completion signal, wherein said connector allows said functional board to be inserted and withdrawn to and from said bus.

10. A data transfer/computer system comprising a bus for transferring data, a connector and a functional circuit board having a functional circuit, a pre-charge resistor and a switching element connected in parallel and interposed between said functional circuit and said connector at a location in close proximity to said connector on an input/output signal path of said functional circuit and a switching control means for controlling conduction of said switching element through synchronization with a delayed clock signal resulting from delaying a bus clock signal for use in data transfers through said bus by a time shorter than a bus-clock cycle time of said bus clock signal in accordance with a board insertion completion signal, wherein said connector allows said functional board to be inserted and withdrawn to and from said bus.

11. A computer system wherein a bus for transferring data is connected to a computer, said computer system comprising:
   a functional circuit board having a functional circuit and a pre-charge resistor and a switching element connected in parallel to an input/output signal path of said functional circuit; and
   a connector provided on a first input/output end of said pre-charge resistor and said switching element, wherein said functional circuit is provided on a second input/output end of said precharged resistor and said switching element, whereby said functional circuit board can be inserted and withdrawn to and from said bus.

12. A computer system wherein a bus for transferring data is connected to a computer, said computer system comprising:
   a functional circuit board having a functional circuit, a pre-charge resistor and a switching element connected in parallel to an input/output signal path of said functional circuit and a switching control means for controlling conduction of said switching element through synchronization with a delayed clock signal resulting from delaying a bus clock signal for use in data transfers through said bus by a time shorter than a bus-clock cycle time of said bus clock signal; and
   a connector provided on a first input/output end of parallel connection of said pre-charge resistor and said switching element, and wherein said functional circuit is provided on a second input/output end of said pre-charge resistor and said switching element, whereby said functional circuit board can be inserted and withdrawn to and from said bus.

13. An active-line inserted/withdrawn functional circuit board comprising a functional circuit, a connector and a pre-charge resistor and a switching element connected in parallel and interposed between said functional circuit and said connector at a location in close proximity to said connector on an input/output signal path of said functional circuit.

14. A functional circuit board comprising a functional circuit, a connector, a pre-charge resistor and a switching element connected in parallel and interposed between said functional circuit and said connector at a location in close proximity to said connector on an input/output signal path of said functional circuit, an input means for receiving a bus clock signal for use in data transfers through a bus and a switching control means for controlling conduction of said switching element by synchronizing said switching element with a delayed clock signal resulting from delaying said bus clock signal received by said input means by a time shorter than a bus-clock cycle time of said bus clock signal.

15. A functional circuit board comprising a functional circuit, a connector, a pre-charge resistor and a switching element connected in parallel and interposed between said functional circuit and said connector at a location in close proximity to said connector on an input/output signal path of said functional circuit, an input means for receiving a bus clock signal for use in data transfers through a bus and receiving a board insertion completion signal and a switching control means for controlling conduction of said switching element by synchronizing said switching element with a delayed clock signal resulting from delaying said bus clock signal received by said input means by a time shorter than a bus-clock cycle time of said bus clock signal in accordance with said board insertion completion signal.

\* \* \* \* \*